J. G. PERRY.
Sausage Filler.
No. 45,743. Patented Jan. 3, 1865.
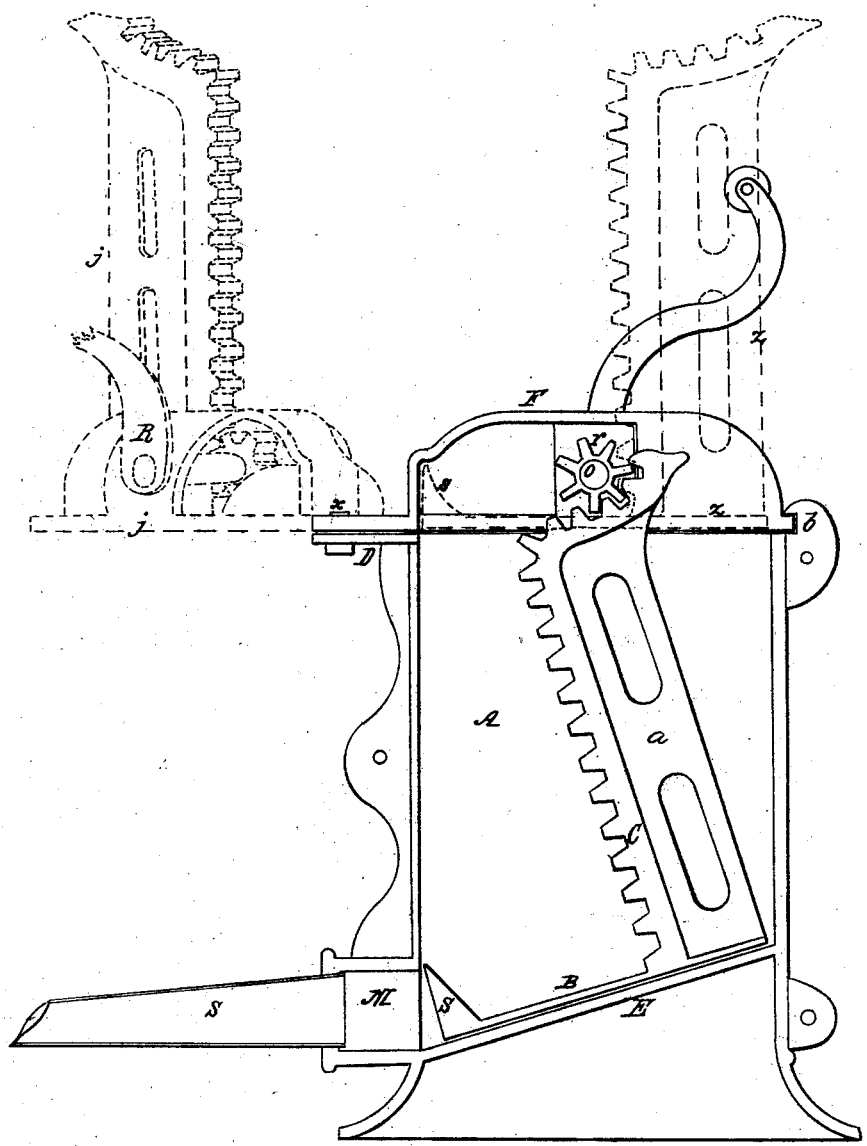
Witnesses:
Inventor:

UNITED STATES PATENT OFFICE.

JOHN G. PERRY, OF SOUTH KINGSTON, RHODE ISLAND.

IMPROVED SAUSAGE-FILLER.

Specification forming part of Letters Patent No. 45,743, dated January 3, 1865.

*To all whom it may concern:*

Be it known that I, JOHN G. PERRY, of South Kingston, in the county of Washington, in the State of Rhode Island, have invented a new and Improved Sausage-Filler; and I do hereby declare that the following is a full and correct description thereof, reference being had to the accompanying drawing, forming part of this specification, and to the letters of reference marked thereon.

The drawing represents a vertical section of the filler with the piston clear down. The dotted lines $z\ z$ show the piston drawn up to the top, and the dotted lines $j\ j$ represent the top of the filler with the piston, &c., turned off to one side, the purpose of which will be hereafter explained.

The construction of my improved filler is as follows: A is an upright vessel having a bottom, E, sloping toward one side, where the discharge-aperture N is made. B is a piston-head having a rack, C, attached to the top of it. A top, F, is secured to the projection D on the side of the vessel by a pivot, $x$, so that it can be turned off to one side. (See dotted lines $j\ j$.)

The top F is made deep enough to hold the piston-head B when it is clear up, and has a shaft, $o$, passing through it, on the middle of which is put a gear-wheel, $r$, the teeth of which mesh into the teeth of the rack C, the rack being held up against the wheel by a flange upon its back, and also being curved at the top to make it take the proper direction when completing its downward motion. R is a crank to turn the shaft by.

The operation is as follows: By turning the crank the piston is drawn up into the top, as shown by the dotted lines $z\ z$, when the top is turned around in the position shown by the dotted lines $j\ j$, so as to leave the top of the vessel open to be filled with the chopped meat, which being done, the top F is turned back to place over the vessel and held down by the catch $b$ on the side. The piston is then forced down by turning the crank. When the piston-head touches the highest part of the bottom, the gear-wheel $r$, by running on the curved part of the rack, tips the piston over and brings the head down flat upon the bottom, forcing all the meat out from between them. The relative positions of the piston-head and bottom of the vessel, approaching each other as they do, at a considerable angle, instead of parallel, enables them to force the meat into the cases, which are placed on the nozzle S, with more ease and more completely than would otherwise be the case.

Having thus described my improve sausage-filler, I claim—

The combination of the nozzle S and cylinder or case A with the piston-head and rack B, constructed substantially as herein described, and for the purpose set forth.

JOHN G. PERRY.

Witnesses:
E. C. CLARKE,
O. H. PERRY.